Patented Apr. 19, 1927.

1,625,530

UNITED STATES PATENT OFFICE.

HERMANN FRITZSCHE, EDUARD KRUMMENACHER, HANS GUBLER, AND OTTO KAISER, OF BASEL, SWITZERLAND, ASSIGNORS TO SOCIETY OF CHEMICAL INDUSTRY IN BASLE, OF BASEL, SWITZERLAND.

INTERMEDIATE PRODUCT FOR THE SYNTHESIS OF DYES AND PROCESS OF MAKING SAME.

No Drawing. Application filed July 20, 1923, Serial No. 652,856, and in Switzerland September 7, 1922.

It has been found that new intermediate products for the synthesis of dyes may be obtained by condensing one molecular proportion of a cyanuric trihalide with one molecular proportion of an amine of the aromatic series derived from a hydrocarbon containing at the most 12 carbon atoms and carrying, on the one hand, at least one mobile atom of hydrogen and, on the other hand, at least one strong acid group.

This condensation may in most cases be carried out in a suitable diluent, and it was surprising to find that as such a medium water is very appropriate. The course of the reaction may be followed, for instance, by the quantity of the hydrogen halide formed, or by the formation of a precipitate or a clear solution, or by the disappearance of the components.
There are thus obtained new intermediate products of the general formula:

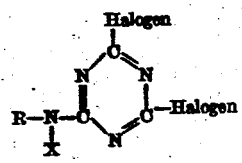

wherein R means an aromatic complex derived from hydrocarbons containing not more than 12 carbon atoms and X hydrogen, alkyl or aralkyl, one of the two residues R and X containing at least one strong acid group.

The new products are colorless to grey and yellowish powders, they are soluble in solvents yielding colorless to yellow and brownish solutions and are characterized by two mobile atoms of halogen at the cyanuric nucleus.

The following examples illustrate the present invention without, however, limiting the same.

*Example 1.*

18.5 parts of cyanuric chloride are suspended in 500 parts of water, treated with 17.2 parts of the hydrochloride of m-aminobenzoic acid, and stirred until the m-aminobenzoic acid has almost completely disappeared. The crystallized condensation product thus obtained is filtered; crystallized from glacial acetic acid it forms small white needles which melt at about 220° C. with decomposition. The presence of two mobile atoms of chlorine may be traced in the new product. With the corresponding quantity of hydrochloride of p-aminosalicylic acid instead of hydrochloride of m-aminobenzoic acid a product is obtained which, crystallized from glacial acetic acid, melts at a temperature higher than 360° C. The presence of two mobile atoms of chlorine and of one group of salicylic acid in the new product may be traced.

*Example 2.*

18.5 parts of cyanuric chloride are suspended in 500 parts of iced water and treated, while stirring, with an aqueous solution of 28.5 parts of sodium monobenzylaniline sulfonate. After some time the cyanuric chloride has disappeared and a colorless solution is formed. The free hydrochloric acid is neutralized and the primary condensation product obtained from 1 molecular proportion of cyanuric chloride with one molecular proportion of monobenzylaniline sulfonic acid is precipitated by adding common salt. The new product forms a grey powder, dissolving easily in water, in which two mobile atoms of chlorine may be traced. It corresponds very probably with the formula

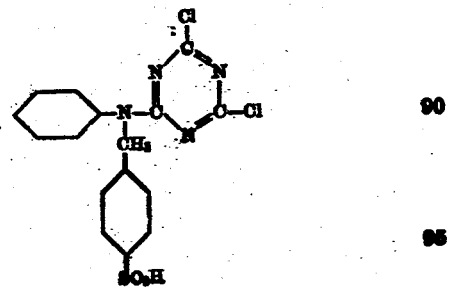

Example 3.

18.5 parts of cyanuric chloride are suspended in iced water and treated, while stirring, with a neutral solution of 24 parts of sodium 1-amino-4-nitro-3-benzene sulfonate. Into this mixture there are run 50 parts of a solution of sodium carbonate of 10 per cent strength, the whole being kept always feebly acid to congo. The cyanuric chloride disappears gradually and the liquid turns into the form of a jelly. It is stirred until the nitraniline sulfonic acid has almost completely disappeared. The primary condensation product from one molecular proportion of cyanuric chloride and one molecular proportion of 1-amino-4-nitro-3-benzene sulfonic acid is then thrown out with chloride of potassium. The product thus obtained forms a fine, crystallized, almost colorless precipitate freely soluble in water; its aqueous solution turns to yellow by addition of alkalies.

Example 4.

18.5 parts of cyanuric chloride are suspended in 500 parts of cold water and treated with an aqueous solution of 19.6 parts of the sodium salt of sulfanilic acid. After some time the sulfanilic acid has almost completely disappeared and the almost colorless and crystallized primary condensation product thus obtained from 1 molecular proportion of cyanuric chloride and one molecular proportion of sulfanilic acid is filtered and dried. It corresponds very probably with the formula

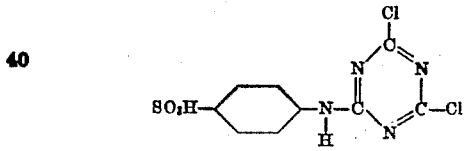

If the 19.5 parts of the sodium salt of sulfanilic acid are replaced by the corresponding quantities of the sodium salts of 1-amino-4-acetylamino-3-benzene sulfonic acid or of 1-amino-4-acetylaminonaphthalene-7-sulfonic acid, similar primary condensation products are obtained, which form light powders containing, on the one hand, two mobile atoms of chlorine and, on the other hand, one acetylamino group.

Example 5.

To a fine suspension of 18.5 parts of cyanuric chloride in 500 parts of water there is added slowly and at a low temperature a solution of 18.8 parts of 1:3-phenylendiamine-4-sulfonic acid and 5.3 parts of sodium carbonate in 100 parts of water. As soon as the cyanuric chloride has disappeared, the precipitate is filtered. The grey powder thus obtained represents the primary condensation product from 1 molecular proportion of 1:3-phenylenediamine-4-sulfonic acid and 1 molecular proportion of cyanuric chloride. It corresponds very probably with the formula

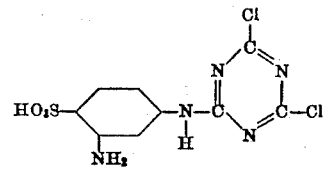

Due to its two mobile atoms of chlorine the product is capable of many transformations.

Example 6.

A fine suspension of 18.5 parts of cyanuric chloride in 1000 parts of water is slightly acidified with hydrochloric acid and treated afterwards, while stirring, at 0° C., with a solution of 26.2 parts of sodium 2:5-aminonaphthol-7-sulfonate in 500 parts of water, the liquid being kept feebly acid by addition of a solution of sodium carbonate (5.3 parts in all). The clear solution thus obtained contains the condensation product of 1 molecular proportion of cyanuric chloride and 1 molecular proportion of 2:5-aminonaphthol-7-sulfonic acid which may be thrown out by means of common salt.

The product is characterized by the fact that by addition of alkalies or alkali metal carbonates it is transformed into a product which no longer reacts with diazo-compounds.

Example 7.

18.5 parts of cyanuric chloride are dissolved by gently warming in 50 parts of acetone, and the solution is poured, while vigorously stirring, into 500 parts of water. Into the suspension of cyanuric chloride thus obtained there is run a solution of 31.9 parts of 1:8-aminonaphthol-3:6-disulfonic acid in 13.3 parts of caustic soda solution of 30 per cent strength and 150 parts of water. The cyanuric chloride dissolves very rapidly, and the condensation product from 1 molecular proportion of cyanuric chloride and one molecular proportion of 1:8-aminonaphthol-3:6-disulfonic acid is separated from the solution by addition of common salt. The new product, still containing two mobile atoms of chlorine, forms in the dry state a white powder soluble in water much more easily than the 1:8-aminonaphthol-3:6-disulfonic acid. It is not diazotizable and its alkaline solutions have no fluorescence in contradistinction to those of the above parent material. The new product corresponds very probably with the formula

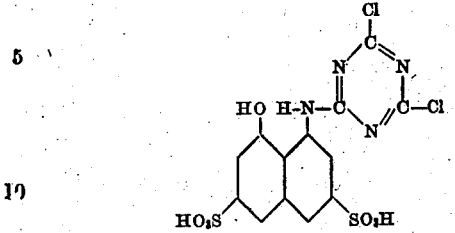

Other aminonaphthols, as for example, the 2:8-aminonaphthol-6-sulfonic acid, the 1:8-aminonaphthol-4-sulfonic acid, the 1:5 aminonaphthol-7-sulfonic acid, and the like, react in the same manner as the 2:5-aminonaphthol-7-sulfonic acid and the 1:8-aminonaphthol-3:6-disulfonic acid.

What we claim is:

1. The herein described process of making new intermediate products for the synthesis of dyes, which consists in condensing one molecular proportion of a cyanuric trihalide with one molecular proportion of an amine of the aromatic series derived from a hydrocarbon having not more than 12 carbon atoms and carrying, on the one hand, at least one mobile hydrogen atom in the amino group and, on the other hand, at least one strong acid group, the condensation being carried out in water.

2. The herein described process of making new intermediate products for the synthesis of dyes, which consists in condensing one molecular proportion of a cyanuric trihalide with one molecular proportion of a primary amine of the aromatic series which contains at least one sulfo group and which is derived from a hydrocarbon having not more than 12 carbon atoms, the condensation being carried out in water.

3. As new intermediate products for the synthesis of dyes, the herein described new compounds of the general formula:

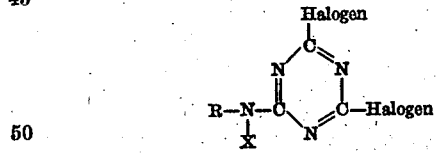

wherein R means an aromatic complex derived from hydrocarbons having not more than 12 carbon atoms, and X hydrogen, alkyl or aralkyl, one of the two residues R and X containing at least one strong acid group, which products are colorless to gray and yellowish powders, dissolving in solvents yielding colorless to yellow and brownish solutions, and which are characterized by two mobile atoms of halogen at the cyanuric nucleus.

4. As new intermediate products for the synthesis of dyes, the herein described new compounds of the general formula:

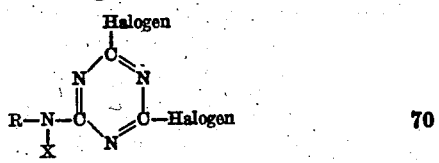

wherein R means an aromatic complex derived from hydrocarbons having not more than 12 carbon atoms, and X hydrogen, alkyl or aralkyl, one of the two residues R and X containing at least one sulfo group, which products are colorless to gray and yellowish powders, dissolving in solvents yielding colorless to yellow and brownish solutions, and which are characterized by two mobile atoms of halogen at the cyanuric nucleus.

5. As new intermediate products for the synthesis of dyes, the herein described new compounds of the general formula:

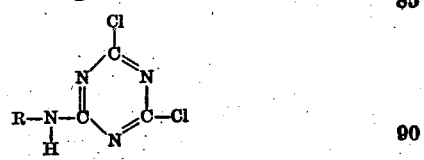

wherein R means an aromatic complex derived from hydrocarbons having not more than 12 carbon atoms and at least one sulfo group, which products are colorless to gray and yellowish powders, dissolving in solvents yielding colorless to yellow and brownish solutions, and which are characterized by two mobile atoms of halogen at the cyanuric nucleus.

In witness whereof we have hereunto signed our names this 6th day of July 1923.

HERMANN FRITZSCHE.
EDUARD KRUMMENACHER.
HANS GUBLER.
OTTO KAISER.